(12) United States Patent
Kawamura et al.

(10) Patent No.: US 11,402,695 B2
(45) Date of Patent: Aug. 2, 2022

(54) LIQUID CRYSTAL DISPLAY APPARATUS

(71) Applicant: NITTO DENKO CORPORATION, Ibaraki (JP)

(72) Inventors: Ryo Kawamura, Ibaraki (JP); Takehito Fuchida, Ibaraki (JP); Katsunori Takada, Ibaraki (JP); Yoshitsugu Kitamura, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 236 days.

(21) Appl. No.: 16/327,118

(22) PCT Filed: Apr. 20, 2018

(86) PCT No.: PCT/JP2018/016246
§ 371 (c)(1),
(2) Date: Feb. 21, 2019

(87) PCT Pub. No.: WO2018/221064
PCT Pub. Date: Dec. 6, 2018

(65) Prior Publication Data
US 2019/0227364 A1 Jul. 25, 2019

(30) Foreign Application Priority Data
Jun. 2, 2017 (JP) .............................. JP2017-109936

(51) Int. Cl.
*G02F 1/13363* (2006.01)
*G02F 1/1335* (2006.01)
*G02B 5/30* (2006.01)

(52) U.S. Cl.
CPC ........... *G02F 1/13363* (2013.01); *G02B 5/30* (2013.01); *G02F 1/133528* (2013.01);
(Continued)

(58) Field of Classification Search
None
See application file for complete search history.

(56) References Cited

U.S. PATENT DOCUMENTS 6,429,920 B1 * 8/2002 Dohi ................... G02F 1/13363
349/113
7,057,684 B2 6/2006 Ishihara et al.
(Continued)

FOREIGN PATENT DOCUMENTS

| CN | 1811555 A | 8/2006 |
| CN | 1853122 A | 10/2006 |

(Continued)

OTHER PUBLICATIONS

International Search Report dated Jul. 24, 2018, issued in counterpart application No. PCT/JP2018/016246, w/English translation (5 pages).
(Continued)

*Primary Examiner* — Edward J Glick
*Assistant Examiner* — David Y Chung
(74) *Attorney, Agent, or Firm* — WHDA, LLP

(57) ABSTRACT

A liquid crystal display apparatus having improved viewing angle characteristics in a region vertically asymmetrical. A liquid crystal display apparatus of the present invention includes: a liquid crystal cell including a liquid crystal layer containing liquid crystal molecules aligned in homogeneous alignment under a state in which an electric field is absent; a first polarizer arranged on a viewer side of the liquid crystal cell; a second polarizer arranged on a back surface side of the liquid crystal cell; a first optical compensation layer arranged between the liquid crystal cell and the first polarizer; and a second optical compensation layer arranged between the liquid crystal cell and the first optical compensation layer. A refractive index $nz_1$ in a thickness direction of the first optical compensation layer is less than 1.5187, and (Continued)

a refractive index $nz_2$ in a thickness direction of the second optical compensation layer is less than 1.5340.

7 Claims, 1 Drawing Sheet

(52) U.S. Cl.
 CPC .. *G02F 1/133538* (2021.01); *G02F 1/133562* (2021.01); *G02F 1/133567* (2021.01); *G02F 2413/02* (2013.01); *G02F 2413/06* (2013.01); *G02F 2413/08* (2013.01)

(56) References Cited

U.S. PATENT DOCUMENTS

| | | | |
|---|---|---|---|
| 7,466,382 B2 | 12/2008 | Yano et al. | |
| 8,274,627 B2 | 9/2012 | Tomonaga et al. | |
| 9,664,945 B2 | 5/2017 | Liu et al. | |
| 2003/0011732 A1* | 1/2003 | Ishihara | G02F 1/133371 349/117 |
| 2006/0152659 A1 | 7/2006 | Ishihara et al. | |
| 2006/0192913 A1* | 8/2006 | Shutou | G02B 5/3016 349/117 |
| 2007/0002228 A1 | 1/2007 | Yano et al. | |
| 2009/0279031 A1* | 11/2009 | Kitagawa | G02B 5/3083 349/118 |
| 2010/0149638 A1* | 6/2010 | Kashima | G02B 5/3016 359/489.2 |
| 2010/0309414 A1* | 12/2010 | Tomonaga | G02B 5/3041 349/96 |
| 2012/0003402 A1 | 1/2012 | Ohashi et al. | |
| 2014/0192304 A1* | 7/2014 | Kang | G02F 1/133634 349/118 |
| 2014/0300847 A1 | 10/2014 | Liu et al. | |
| 2016/0131809 A1 | 5/2016 | Takeda et al. | |
| 2016/0291373 A1 | 10/2016 | Iida | |
| 2016/0313590 A1* | 10/2016 | Kang | G02F 1/13363 |
| 2018/0239199 A1 | 8/2018 | Osato et al. | |

FOREIGN PATENT DOCUMENTS

| | | |
|---|---|---|
| CN | 101849207 A | 9/2010 |
| JP | 2009-139747 A | 6/2009 |
| JP | 4938632 B2 | 5/2012 |
| JP | 2014-97503 A | 5/2014 |
| JP | 2016-191900 A | 11/2016 |
| TW | 574521 B | 2/2004 |
| TW | 200931132 A | 7/2009 |
| TW | 201035605 A1 | 10/2010 |
| TW | 201437724 A | 10/2014 |
| TW | 201640189 A | 11/2016 |
| WO | 2006/090700 A1 | 8/2006 |
| WO | 2017/026459 A1 | 2/2017 |

OTHER PUBLICATIONS

Decision to Grant a Patent dated Dec. 5, 2018, issued in counterpart Japanese Patent Application No. 2017-109936, w/English translation (6 pages).
Office Action dated May 9, 2019, issued in counterpart TW Application No. 107115421, with English translation. (13 pages).
Office Action dated Sep. 19, 2019, issued in counterpart CN application No. 201880003762.3, with English translation. (12 pages).
Office Action dated May 21, 2021, issued in counterpart EP application No. 18 808 652.4. (5 pages).

* cited by examiner

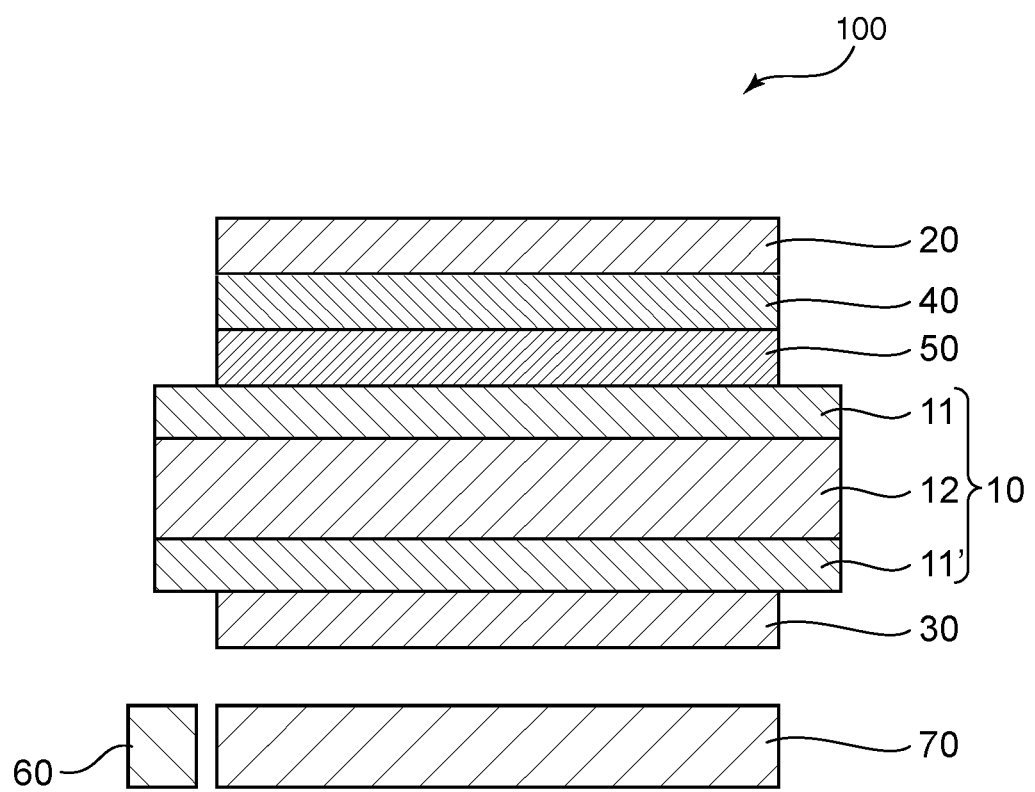

LIQUID CRYSTAL DISPLAY APPARATUS

TECHNICAL FIELD

The present invention relates to a liquid crystal display apparatus.

BACKGROUND ART

A liquid crystal display apparatus has been utilized as display portions, such as various meters and a navigation system arranged in the console of an automobile. Such on-board liquid crystal display apparatus is mainly viewed by a driver, and hence display characteristics (e.g., contrast and a tinge) at the four corners of a predetermined region shifted upward with respect to a front direction (e.g., (viewing angle φ in a vertical direction, viewing angle θ in a horizontal direction)=(+20°, +50°), (+20°, −50°), (−20°, +50°), and (−20°, −50°)) are important. However, in a conventional liquid crystal display apparatus, substantially only the control of viewing angle characteristics symmetrical with respect to the front direction ((φ, θ)=(0°, 0°)) has been performed. Therefore, a liquid crystal display apparatus improved in viewing angle characteristics in a region vertically asymmetrical with respect to a front horizontal direction has been desired.

CITATION LIST

Patent Literature

[PTL 1] JP 2009-139747 A
[PTL 2] JP 2014-097503 A

SUMMARY OF INVENTION

Technical Problem

The present invention has been made to solve the above-mentioned conventional problem, and an object of the present invention is to provide a liquid crystal display apparatus improved in viewing angle characteristics in a region vertically asymmetrical with respect to a front horizontal direction.

A liquid crystal display apparatus according to an embodiment of the present invention includes: a liquid crystal cell including a liquid crystal layer containing liquid crystal molecules aligned in homogeneous alignment under a state in which an electric field is absent; a first polarizer arranged on a viewer side of the liquid crystal cell; a second polarizer arranged on a back surface side of the liquid crystal cell; a first optical compensation layer arranged between the liquid crystal cell and the first polarizer; and a second optical compensation layer arranged between the liquid crystal cell and the first optical compensation layer. A refractive index $nz_1$ in a thickness direction of the first optical compensation layer is less than 1.5187, and a refractive index $nz_2$ in a thickness direction of the second optical compensation layer is less than 1.5340.

In one embodiment of the present invention, the first optical compensation layer shows a refractive index characteristic of $nx>ny>nz$, and the second optical compensation layer shows a refractive index characteristic of $nz>nx>ny$.

In one embodiment of the present invention, an initial alignment direction of the liquid crystal cell and an absorption axis direction of the second polarizer are substantially parallel to each other.

In one embodiment of the present invention, a slow axis direction of the first optical compensation layer and a slow axis direction of the second optical compensation layer are substantially parallel to each other.

In one embodiment of the present invention, the liquid crystal molecules of the liquid crystal layer each have a pretilt.

In one embodiment of the present invention, an absorption axis direction of the first polarizer is a horizontal direction of a viewer.

Advantageous Effects of Invention

According to the present invention, in the liquid crystal display apparatus including the homogeneously aligned liquid crystal cell, the two optical compensation layers are arranged on the viewer side of the liquid crystal cell, and the refractive index in the thickness direction of each of the optical compensation layers is set to less than a predetermined value, and hence the liquid crystal display apparatus improved in viewing angle characteristics in the region vertically asymmetrical with respect to the front horizontal direction can be obtained.

BRIEF DESCRIPTION OF DRAWINGS

FIG. 1 is a schematic sectional view of a liquid crystal display apparatus according to one embodiment of the present invention.

DESCRIPTION OF EMBODIMENTS

Embodiments of the present invention are described below with reference to the drawing. However, the present invention is not limited to these embodiments.

(Definitions of Terms and Symbols)

The definitions of terms and symbols used herein are as described below.

(1) Refractive Indices (nx, ny, and nz)

"nx" represents a refractive index in a direction in which an in-plane refractive index is maximum (that is, slow axis direction), "ny" represents a refractive index in a direction perpendicular to the slow axis in the plane (that is, fast axis direction), and "nz" represents a refractive index in a thickness direction.

(2) In-Plane Retardation (Re)

"Re (λ)" refers to an in-plane retardation measured at 23° C. with light having a wavelength of λ nm. The Re (λ) is determined from the equation "Re=(nx−ny)×d" when the thickness of a layer (film) is represented by d (nm). For example, "Re(550)" refers to an in-plane retardation measured at 23° C. with light having a wavelength of 550 nm.

(3) Thickness Direction Retardation (Rth)

"Rth(λ)" refers to a thickness direction retardation measured at 23° C. with light having a wavelength of λ nm. The Rth(λ) is determined from the equation "Rth=(nx−nz)×d" when the thickness of a layer (film) is represented by d (nm). For example, "Rth(550)" refers to a thickness direction retardation measured at 23° C. with light having a wavelength of 550 nm.

(4) Nz Coefficient

An Nz coefficient is determined from the equation "Nz=Rth/Re".

(5) Substantially Perpendicular or Parallel

The expressions "substantially perpendicular" and "approximately perpendicular" include a case in which an angle formed by two directions is 90°±10°, and the angle is preferably 90°±7°, more preferably 90°±5°. The expressions "substantially parallel" and "approximately parallel" include a case in which an angle formed by two directions is 0°±10°, and the angle is preferably 0°±7°, more preferably 0°±5°. Moreover, the simple expression "perpendicular" or "parallel" as used herein may include a substantially perpendicular state or a substantially parallel state.

(6) Subscript

The subscript "1" represents a first optical compensation layer, and the subscript "2" represents a second optical compensation layer.

A. Overall Configuration of Liquid Crystal Display Apparatus

FIG. 1 is a schematic sectional view of a liquid crystal display apparatus according to one embodiment of the present invention. A liquid crystal display apparatus 100 includes: a liquid crystal cell 10; a first polarizer 20 arranged on the viewer side of the liquid crystal cell 10; a second polarizer 30 arranged on the back surface side of the liquid crystal cell 10; a first optical compensation layer 40 arranged between the liquid crystal cell 10 and the first polarizer 20; and a second optical compensation layer 50 arranged between the liquid crystal cell 10 and the first optical compensation layer 40. The liquid crystal display apparatus 100 practically further includes a backlight unit. The backlight unit includes a light source 60 and a light guide plate 70. The backlight unit may further include any appropriate other member (e.g., a diffusion sheet or a prism sheet). In the illustrated example, the backlight unit is of an edge light system, but any appropriate other system (e.g., a direct system) may be adopted for the backlight unit.

The first optical compensation layer 40 typically shows a refractive index characteristic of nx>ny>nz, and the second optical compensation layer 50 typically shows a refractive index characteristic of nz>nx>ny. Further, in the present invention, a refractive index $nz_1$ in the thickness direction of the first optical compensation layer 40 is less than 1.5187, and a refractive index $nz_2$ in the thickness direction of the second optical compensation layer 50 is less than 1.5340. When two optical compensation layers showing predetermined refractive index characteristics are arranged in a predetermined positional relationship, and refractive indices in the thickness directions of the two optical compensation layers are set within such ranges, contrast at each of four corners in a region vertically asymmetrical with respect to a front horizontal direction (e.g., (viewing angle φ in a vertical direction, viewing angle θ in a horizontal direction)=(+20°, +50°), (+20°, −50°), (−20°, +50°), and (−20°, −50°) can be improved. In particular, contrast at each of the upper two corners (e.g., (φ, θ)=(+20°, +50°) and (+20°, −50°) that has heretofore been difficult to improve can be significantly improved. One achievement of the present invention is that viewing angle characteristics (in particular, the viewing angle characteristics of contrast) in the region vertically asymmetrical with respect to the front horizontal direction are improved as described above.

The liquid crystal display apparatus of the present invention has a contrast at, for example, each of (φ, θ)=(+20°, +50°), (+20°, −50°), (−20°, +50°), and (−20°, −50°) of preferably 100 or more, more preferably 150 or more, still more preferably 200 or more. In addition, the liquid crystal display apparatus of the present invention has a contrast at, for example, each of (φ, θ)=(+20°, +40°), (+20°, −40°), (−20°, +40°), and (−20°, −40°) of preferably 500 or more, more preferably 650 or more, still more preferably 750 or more.

The liquid crystal display apparatus according to the embodiment of the present invention may be in a so-called O mode or a so-called E mode. The term "liquid crystal panel in the O mode" refers to a liquid crystal display panel in which the absorption axis direction of the polarizer arranged on the light source side of the liquid crystal cell is substantially parallel to the initial alignment direction of the liquid crystal cell. The term "liquid crystal panel in the E mode" refers to a liquid crystal panel in which the absorption axis direction of the polarizer arranged on the light source side of the liquid crystal cell is substantially perpendicular to the initial alignment direction of the liquid crystal cell. The term "initial alignment direction of the liquid crystal cell" refers to such a direction that, under a state in which an electric field is absent, the in-plane refractive index of the liquid crystal layer obtained as a result of alignment of liquid crystal molecules contained in the liquid crystal layer becomes maximum (i.e., a slow axis direction). The liquid crystal display apparatus is preferably in the O mode.

In the liquid crystal display apparatus according to the embodiment of the present invention, the absorption axis direction of the first polarizer 20 and the absorption axis direction of the second polarizer 30 are typically substantially perpendicular to each other. In addition, the absorption axis direction of the first polarizer 20 and the slow axis direction of the first optical compensation layer 40 are typically substantially perpendicular to each other. The slow axis direction of the first optical compensation layer 40 and the slow axis direction of the second optical compensation layer 50 are typically substantially parallel to each other.

In one embodiment, the absorption axis direction of the first polarizer 20 is the horizontal direction of a viewer. Therefore, in this embodiment, when the horizontal direction is defined as 0°, an axial relationship among the respective optical films and the respective members forming the liquid crystal display apparatus is typically as follows: the angle of the absorption axis of the first polarizer is 0°, the angle of the slow axis of the first optical compensation layer is 90°, the angle of the slow axis of the second optical compensation layer is 90°, the angle of the initial alignment direction of the liquid crystal cell is 90°, and the angle of the absorption axis of the second polarizer is 90°.

The liquid crystal display apparatus according to the embodiment of the present invention may further include any appropriate other member. For example, any other optical compensation layer (retardation film) may be further arranged. The optical characteristics, number, combination, arrangement positions, and the like of the other optical compensation layers may be appropriately selected in accordance with, for example, purposes and desired optical characteristics. The configuration of a liquid crystal display apparatus that is well known and commonly used in the art may be adopted as a matter that is not described herein.

Each member and each optical film forming the liquid crystal display apparatus are described below.

B. Liquid Crystal Cell

The liquid crystal cell 10 has a pair of substrates 11 and 11', and a liquid crystal layer 12 serving as a display medium interposed between the substrates. In a general configuration, a color filter and a black matrix are arranged on one substrate, and a switching element configured to control the electro-optical characteristics of liquid crystal, a scanning line configured to apply a gate signal to the switching element and a signal line configured to apply a source signal thereto, and a pixel electrode and a counter electrode are arranged on the other substrate. An interval (cell gap) between the substrates is controlled by a spacer or the like.

For example, an alignment film formed of polyimide may be arranged on the side of each of the substrates in contact with the liquid crystal layer.

In one embodiment, the liquid crystal layer contains liquid crystal molecules aligned in homogeneous alignment under a state in which an electric field is absent. The term "liquid crystal molecules aligned in homogeneous alignment" refers to liquid crystal molecules in the following state: as a result of an interaction between an alignment-treated substrate and each of the liquid crystal molecules, the alignment vector of each of the liquid crystal molecules is aligned in a parallel and uniform manner with respect to the plane of the substrate. Such liquid crystal layer (as a result, the liquid crystal cell) typically shows a three-dimensional refractive index of nx>ny=nz. The "ny=nz" as used herein includes not only a case in which ny is completely equal to nz, but also a case in which ny is substantially equal to nz. Typical examples of a drive mode using the liquid crystal layer showing such three-dimensional refractive index include an in-plane switching (IPS) mode and a fringe field switching (FFS) mode. The above-mentioned IPS mode includes a super in-plane switching (S-IPS) mode and an advanced super in-plane switching (AS-IPS) mode, each of which adopts a V-shaped electrode, a zigzag electrode, or the like. In addition, the above-mentioned FFS mode includes an advanced fringe field switching (A-FFS) mode and an ultra fringe field switching (U-FFS) mode, each of which adopts a V-shaped electrode, a zigzag electrode, or the like.

In one embodiment, the liquid crystal molecules of the liquid crystal layer each have a pretilt. That is, the alignment vector of each of the liquid crystal molecules is slightly tilted with respect to the plane of the substrate. A pretilt angle is preferably from 0.1° to 1.0°, more preferably from 0.2° to 0.7°. The liquid crystal display apparatus according to the embodiment of the present invention exhibits a significant effect when the liquid crystal molecules of the liquid crystal layer each have a pretilt. In particular, the apparatus has the following technical meaning: optical design in accordance with the pretilt can be performed.

C. Polarizer

Any appropriate polarizer may be adopted as each of the first polarizer and the second polarizer (hereinafter sometimes collectively simply referred to as "polarizers"). For example, a resin film forming the polarizer may be a single-layer resin film, or may be a laminate of two or more layers.

Specific examples of the polarizer including a single-layer resin film include: a polarizer obtained by subjecting a hydrophilic polymer film, such as a polyvinyl alcohol (PVA)-based film, a partially formalized PVA-based film, or an ethylene-vinyl acetate copolymer-based partially saponified film, to dyeing treatment with a dichroic substance, such as iodine or a dichroic dye, and stretching treatment; and a polyene-based alignment film, such as a dehydration-treated product of PVA or a dehydrochlorination-treated product of polyvinyl chloride. A polarizer obtained by dyeing the PVA-based film with iodine and uniaxially stretching the resultant is preferably used because the polarizer is excellent in optical characteristics.

The dyeing with iodine is performed by, for example, immersing the PVA-based film in an aqueous solution of iodine. The stretching ratio of the uniaxial stretching is preferably from 3 times to 7 times. The stretching may be performed after the dyeing treatment, or may be performed while the dyeing is performed. In addition, the dyeing may be performed after the stretching has been performed. The PVA-based film is subjected to swelling treatment, cross-linking treatment, washing treatment, drying treatment, or the like as required. For example, when the PVA-based film is immersed in water to be washed with water before the dyeing, contamination or an antiblocking agent on the surface of the PVA-based film can be washed off. In addition, the PVA-based film is swollen and hence dyeing unevenness or the like can be prevented.

The thickness of the polarizer is preferably from 1 µm to 80 µm, more preferably from 10 µm to 50 µm, still more preferably from 15 µm to 40 µm, particularly preferably from 20 µm to 30 µm. When the thickness of the polarizer falls within such range, durability under high temperature and high humidity required for on-board applications can be excellent.

The polarizer preferably shows absorption dichroism at any wavelength in the wavelength range of from 380 nm to 780 nm. The single layer transmittance of the polarizer is preferably from 42.0% to 46.0%, more preferably from 44.5% to 46.0% The polarization degree of the polarizer is preferably 97.0% or more, more preferably 99.0% or more, still more preferably 99.9% or more.

A protective layer (not shown) may be arranged on at least one surface of each of the first polarizer 20 and the second polarizer 30. That is, each of the first polarizer 20 and the second polarizer 30 may be incorporated as a polarizing plate into the liquid crystal display apparatus.

The protective layer is formed of any appropriate film that may be used as a protective layer for a polarizer. A material serving as a main component of the film is specifically, for example: a cellulose-based resin, such as triacetylcellulose (TAC); a transparent resin, such as a polyester-based, polyvinyl alcohol-based, polycarbonate-based, polyamide-based, polyimide-based, polyether sulfone-based, polysulfone-based, polystyrene-based, polynorbornene-based, polyolefin-based, (meth)acrylic, or acetate-based transparent resin; or a thermosetting resin or a UV-curable resin, such as a (meth)acrylic, urethane-based, (meth) acrylic urethane-based, epoxy-based, or silicone-based thermosetting resin or UV-curable resin. A further example thereof is a glassy polymer, such as a siloxane-based polymer. In addition, a polymer film described in JP 2001-343529 A (WO 01/37007 A1) may be used. For example, a resin composition containing a thermoplastic resin having a substituted or unsubstituted imide group on a side chain thereof, and a thermoplastic resin having a substituted or unsubstituted phenyl group and a nitrile group on side chains thereof may be used as the material for the film, and the composition is, for example, a resin composition containing an alternating copolymer formed of isobutene and N-methylmaleimide, and an acrylonitrile-styrene copolymer. The polymer film may be, for example, an extrudate of the resin composition.

When the protective layer is arranged on the viewer side of the first polarizer 20, the protective layer may be subjected to surface treatment, such as hard coat treatment, antireflection treatment, anti-sticking treatment, or antiglare treatment, as required.

The thickness of the protective layer is typically 5 mm or less, preferably 1 mm or less, more preferably from 1 µm to 500 µm, still more preferably from 5 µm to 150 µm. When the surface treatment is performed, the thickness of the protective layer is a thickness including the thickness of a surface treatment layer.

When the protective layer (hereinafter referred to as "inner protective layer") is arranged on the liquid crystal cell side of the first polarizer 20 and/or the second polarizer 30, the inner protective layer is preferably optically isotropic.

The phrase "be optically isotropic" refers to having an in-plane retardation Re(550) of from 0 nm to 10 nm and a thickness direction retardation Rth(550) of from −10 nm to +10 nm. The inner protective layer may include any appropriate material as long as the inner protective layer is optically isotropic. The material may be appropriately selected from, for example, the materials described above for the protective layer.

The thickness of the inner protective layer is preferably from 5 µm to 200 µm, more preferably from 10 µm to 100 µm, still more preferably from 15 µm to 95 µm.

D. First Optical Compensation Layer

As described above, the first optical compensation layer typically shows a refractive index characteristic of nx>ny>nz. As described above, the refractive index $nz_1$ in the thickness direction of the first optical compensation layer is less than 1.5187, preferably 1.5181 or less, more preferably 1.5175 or less. The lower limit of the $nz_1$ is, for example, 1.5160. When the refractive index in the thickness direction of the first optical compensation layer is set within such range, by virtue of a synergistic effect with an effect exhibited by setting the $nz_2$ to be described later to less than a predetermined value, the viewing angle characteristics of contrast in the region vertically asymmetrical with respect to the front horizontal direction (in particular, at a predetermined position in an upper region with respect to the front horizontal direction) can be improved.

The in-plane retardation Re(550) of the first optical compensation layer is preferably from 80 nm to 135 nm, more preferably from 90 nm to 130 nm, still more preferably from 95 nm to 110 nm. When the in-plane retardation falls within such range, the front contrast of the liquid crystal display apparatus can also be improved.

The thickness direction retardation Rth(550) of the first optical compensation layer is preferably from 110 nm to 160 nm, more preferably from 130 nm to 150 nm, still more preferably from 135 nm to 140 nm. When the thickness direction retardation falls within such range, contrast in an oblique direction of a liquid crystal panel having a pretilt angle can be improved.

The Nz coefficient of the first optical compensation layer is preferably from 1.20 to 1.90, more preferably from 1.25 to 1.50, still more preferably from 1.28 to 1.40. When the Nz coefficient falls within such range, the contrast in the oblique direction of the liquid crystal panel having a pretilt angle can be improved.

In one embodiment, the first optical compensation layer may be formed by subjecting a resin film to stretching treatment. Specifically, the first optical compensation layer having the above-mentioned desired optical characteristics (e.g., a refractive index characteristic and a refractive index in a thickness direction) may be obtained by appropriately selecting, for example, the kind of a resin forming the resin film, conditions for the stretching (e.g., a stretching temperature, a stretching ratio, and a stretching direction), and a method for the stretching. Any appropriate resin may be adopted as the resin forming the resin film. Specific examples thereof include a cycloolefin-based resin (e.g., a norbornene-based resin), a polycarbonate-based resin, and a cellulose-based resin.

The norbornene-based resin is a resin polymerized by using a norbornene-based monomer as a polymerization unit. Examples of the norbornene-based monomer include: norbornene, alkyl and/or alkylidene substituted products thereof, such as 5-methyl-2-norbornene, 5-dimethyl-2-norbornene, 5-ethyl-2-norbornene, 5-butyl-2-norbornene, and 5-ethylidene-2-norbornene, and polar group (e.g., halogen) substituted products thereof; dicyclopentadiene and 2,3-dihydrodicyclopentadiene; dimethanooctahydronaphthalene, alkyl and/or alkylidene substituted products thereof, and polar group (e.g., halogen) substituted products thereof, such as
6-methyl-1,4:5,8-dimethano-1,4,4a,5,6,7,8,8a-octahydronaphthalene,
6-ethyl-1,4:5,8-dimethano-1,4,4a,5,6,7,8,8a-octahydronaphthalene,
6-ethylidene-1,4:5,8-dimethano-1,4,4a,5,6,7,8,8a-octahydronaphthalene,
6-chloro-1,4:5,8-dimethano-1,4,4a,5,6,7,8,8a-octahydronaphthalene,
6-cyano-1,4:5,8-dimethano-1,4,4a,5,6,7,8,8a-octahydronaphthalene,
6-pyridyl-1,4:5,8-dimethano-1,4,4a,5,6,7,8,8a-octahydronaphthalene, and
6-methoxycarbonyl-1,4:5,8-dimethano-1,4,4a,5,6,7,8,8a-octahydronaphthalene; and trimers or tetramers of cyclopentadiene, such as
4,9:5,8-dimethano-3a,4,4a,5,8,8a,9,9a-octahydro-1H-benzoindene and
4,11:5,10:6,9-trimethano-3a,4,4a,5,5a,6,9,9a,10,10a,11,11a-dodecahydro-1H-cyclopentaanthracene. The norbornene-based resin may be a copolymer of the norbornene-based monomer and another monomer.

An aromatic polycarbonate is preferably used as the polycarbonate-based resin. The aromatic polycarbonate may be typically obtained by a reaction between a carbonate precursor and an aromatic dihydric phenol compound. Specific examples of the carbonate precursor include phosgene, bischloroformates of dihydric phenols, diphenyl carbonate, di-p-tolyl carbonate, phenyl-p-tolyl carbonate, di-p-chlorophenyl carbonate, and dinaphthyl carbonate. Of those, phosgene and diphenyl carbonate are preferred. Specific examples of the aromatic dihydric phenol compound include
2,2-bis(4-hydroxyphenyl)propane,
2,2-bis(4-hydroxy-3,5-dimethylphenyl)propane,
bis(4-hydroxyphenyl)methane, 1,1-bis(4-hydroxyphenyl)ethane,
2,2-bis(4-hydroxyphenyl)butane,
2,2-bis(4-hydroxy-3,5-dimethylphenyl)butane,
2,2-bis(4-hydroxy-3,5-dipropylphenyl)propane,
1,1-bis(4-hydroxyphenyl)cyclohexane, and
1,1-bis(4-hydroxyphenyl)-3,3,5-trimethylcyclohexane.
Those compounds may be used alone or in combination thereof. Of those,
2,2-bis(4-hydroxyphenyl)propane,
1,1-bis(4-hydroxyphenyl)cyclohexane, and
1,1-bis(4-hydroxyphenyl)-3,3,5-trimethylcyclohexane are preferably used. In particular, 2,2-bis(4-hydroxyphenyl)propane and 1,1-bis(4-hydroxyphenyl)-3,3,5-trimethylcyclohexane are preferably used in combination.

The cellulose-based resin is preferably a cellulose organic acid ester or a cellulose mixed organic acid ester obtained by substituting part or all of the hydroxy groups of cellulose with an acetyl group, a propionyl group, and/or a butyl group. Examples of the cellulose organic acid ester include cellulose acetate, cellulose propionate, and cellulose butyrate. Examples of the cellulose mixed organic acid ester include cellulose acetate propionate and cellulose acetate butyrate. The cellulose-based resin may be obtained by, for example, a method described in paragraphs [0040] and [0041] of JP2001-188128A. The acetyl substitution degree of the cellulose acetate is preferably from 2.0 to 3.0, more preferably from 2.5 to 3.0. The propionyl substitution degree of the cellulose propionate is preferably from 2.0 to 3.0, more preferably from 2.5 to 3.0. In the case where the cellulose-based resin is a mixed organic acid ester obtained by substituting part of the hydroxy groups of cellulose with an acetyl group and substituting another part thereof with a propionyl group, the total of its acetyl substitution degree and propionyl substitution degree is preferably from 2.0 to 3.0, more preferably from 2.5 to 3.0. In this case, the acetyl substitution degree is preferably from 0.1 to 2.9, and the propionyl substitution degree is preferably from 0.1 to 2.9.

Examples of the stretching method include lateral uniaxial stretching, fixed-end biaxial stretching, and sequential biaxial stretching. The stretching temperature is preferably from 135° C. to 165° C., more preferably from 140° C. to 160° C. The stretching ratio is preferably from 1.2 times to 3.2 times, more preferably from 1.3 times to 3.1 times.

When the first optical compensation layer is formed by stretching the resin film, its thickness is preferably from 10 μm to 100 μm, more preferably from 20 μm to 80 μm, still more preferably from 30 μm to 60 μm.

In another embodiment, the first optical compensation layer may be formed from an applied film of a non-liquid crystalline polymer. Specific examples of the non-liquid crystalline polymer include polyamide, polyimide, polyester, polyetherketone, polyamide-imide, and polyesterimide. Those polymers may be used alone or in combination thereof. Of those, polyimide is particularly preferred because the polyimide has high transparency, a high alignment property, and a high stretching property. In this embodiment, the first optical compensation layer may be typically formed by applying a solution of the non-liquid crystalline polymer to a substrate film and removing its solvent. In the formation method, treatment (e.g., stretching treatment) for imparting optical biaxiality (nx>ny>nz) is preferably performed. When such treatment is performed, a difference in refractive index (nx>ny) can be reliably imparted to the inside of the plane of the layer. The first optical compensation layer formed on a substrate film may be typically transferred onto the polarizer. A specific example of the polyimide and a specific example of the method of forming an optical compensation layer are a polymer and a method of producing an optical compensation film described in JP 2004-46065 A. In this case, the thickness of the first optical compensation layer is preferably from 0.1 μm to 10 μm, more preferably from 0.1 μm to 8 μm, still more preferably from 0.1 μm to 5 μm.

E. Second Optical Compensation Layer

As described above, the second optical compensation layer typically shows a refractive index characteristic of nz>nx>ny. As described above, the refractive index $nz_2$ in the thickness direction of the second optical compensation layer is less than 1.5340, preferably 1.5321 or less, more preferably 1.5307 or less. The lower limit of the $nz_2$ is, for example, 1.5300. When the refractive index in the thickness direction of the second optical compensation layer is set within such range, by virtue of a synergistic effect with the effect exhibited by setting the $nz_1$ described above to less than a predetermined value, the viewing angle characteristics of contrast in the region vertically asymmetrical with respect to the front horizontal direction (in particular, at a predetermined position in an upper region with respect to the front horizontal direction) can be improved.

The in-plane retardation Re (550) of the second optical compensation layer is preferably from 25 nm to 55 nm, more preferably from 30 nm to 50 nm, still more preferably from 35 nm to 45 nm. When the in-plane retardation falls within such range, the front contrast of the liquid crystal display apparatus can also be improved.

The thickness direction retardation Rth (550) of the second optical compensation layer is preferably from −105 nm to −65 nm, more preferably from −100 nm to −75 nm, still more preferably from −90 nm to −85 nm. When the thickness direction retardation falls within such range, contrast in an oblique direction of a liquid crystal panel having a pretilt angle can be improved.

The Nz coefficient of the second optical compensation layer is preferably from −4.2 to −1.5, more preferably from −3.0 to −2.1, still more preferably from −2.8 to −2.4. When the Nz coefficient falls within such range, the contrast in the oblique direction of the liquid crystal panel having a pretilt angle can be improved.

The second optical compensation layer typically includes a resin film. A material for the resin film is typically, for example, a resin material having negative birefringence. Specific examples of the resin material include an acrylic resin, a styrene-based resin, a maleimide-based resin, and a fumarate-based resin.

The thickness of the second optical compensation layer is preferably from 5 μm to 50 μm, more preferably from 10 μm to 35 μm.

F. Backlight Unit

The light source 60 is arranged at a position corresponding to a side surface of the light guide plate 70. For example, a LED light source formed by arraying a plurality of LEDs may be used as the light source. Any appropriate light guide plate may be used as the light guide plate 70. For example, a light guide plate having a lens pattern formed on its back surface side or a light guide plate having a prism shape or the like formed on its back surface side and/or its viewer side is used, so that light from a lateral direction can be deflected in its thickness direction. A light guide plate having prism shapes formed on its back surface side and its viewer side is preferably used. In the light guide plate, the ridge line directions of the prism shape formed on the back surface side and the prism shape formed on the viewer side are preferably perpendicular to each other. When such light guide plate is used, light that is more easily converged can be caused to enter a prism sheet (not shown).

INDUSTRIAL APPLICABILITY

The liquid crystal display apparatus of the present invention can be suitably used for on-board devices, such as various meters arranged in a console, a reverse monitor, a monitor for a car navigation system, and a car audio.

REFERENCE SIGNS LIST

10 liquid crystal cell
20 first polarizer
30 second polarizer
40 first optical compensation layer
50 second optical compensation layer
100 liquid crystal display apparatus

The invention claimed is:
1. A liquid crystal display apparatus, comprising:
   a liquid crystal cell including a liquid crystal layer containing liquid crystal molecules aligned in homogeneous alignment under a state in which an electric field is absent;
   a first polarizer arranged on a viewer side of the liquid crystal cell;
   a second polarizer arranged on a back surface side of the liquid crystal cell;

a first optical compensation layer arranged between the liquid crystal cell and the first polarizer; and a second optical compensation layer arranged between the liquid crystal cell and the first optical compensation layer, wherein a refractive index $nz_1$ in a thickness direction of the first optical compensation layer is less than 1.5187, and a refractive index $nz_2$ in a thickness direction of the second optical compensation layer is less than 1.5340, and wherein the first optical compensation layer has an NZ coefficient of 1.20 to 1.90, and the second optical compensation layer has an NZ coefficient of −4.2 to −1.5.

2. The liquid crystal display apparatus according to claim 1, wherein the first optical compensation layer shows a refractive index characteristic of nx >ny >nz, and the second optical compensation layer shows a refractive index characteristic of nz>nx>ny.

3. The liquid crystal display apparatus according to claim 1, wherein an initial alignment direction of the liquid crystal cell and an absorption axis direction of the second polarizer are substantially parallel to each other.

4. The liquid crystal display apparatus according to claim 1, wherein a slow axis direction of the first optical compensation layer and a slow axis direction of the second optical compensation layer are substantially parallel to each other.

5. The liquid crystal display apparatus according to claim 1, wherein the liquid crystal molecules of the liquid crystal layer each have a pretilt.

6. The liquid crystal display apparatus according to claim 1, wherein an absorption axis direction of the first polarizer is a horizontal direction of a viewer.

7. The liquid crystal display apparatus according to claim 1, wherein the refractive index $nz_1$ in the thickness direction of the first optical compensation layer is greater than or equal to 1.5160 and less than 1.5187, and the refractive index $nz_2$ in the thickness direction of the second optical compensation layer is greater than or equal to 1.5300 and less than 1.5340.

* * * * *